Oct. 9, 1956   HANS-JOACHIM KRUG   2,765,592
MACHINE TOOL
Filed Sept. 29, 1952   3 Sheets-Sheet 2

INVENTOR.
HANS-JOACHIM KRUG
BY Michael S. Striker
Agt.

INVENTOR.
HANS-JOACHIM KRUG
BY Michael S. Striker
Agt.

United States Patent Office 2,765,592
Patented Oct. 9, 1956

2,765,592

MACHINE TOOL

Hans-Joachim Krug, Offenbach (Main), Germany

Application September 29, 1952, Serial No. 312,135

Claims priority, application Germany September 28, 1951

20 Claims. (Cl. 51—134)

The present invention relates to machine tools and more particularly to flat-grinding machines having a work tool movably mounted at a point of the path along which the work pieces are carried by a movable support.

It is an object of the present invention to provide a machine tool of the kind described in which the movement of the work tool is carried out in dependence on the motion of the movable support.

It is another object of the present invention to provide a machine tool of the kind described which avoids a too frequent adjustment of the work tool.

It is a further object of the present invention to provide a flat-grinding machine in which the grinding wheel is adjusted in response to measuring means such as feelers and the adjustment can take place only in predetermined positions of the movable support.

A machine tool according to the preesnt invention comprises in its broadest aspects a movable support adapted to carry work pieces along a predetermined path, a work tool forming part of the machine tool and movably mounted at a point of the path, feeding means for moving the work tool toward and away from a work piece carried by the movable support, operating means for operating the feeding means, first actuating means operatively connected with the operating means and arranged at a point along the path and operable by each of the work pieces for actuation of the operating means when the actual dimension of any one of the work pieces passing along the path differs from a predetermined dimension thereof, connecting means for connecting the first actuating means with the operating means, and second actuating means operated by the movable support and actuating the connecting means for periodically connecting the first actuating means with the operating means.

In a preferred embodiment of the present invention the operating means include an electromagnet for operating the feeding means and the first actuating means adapted to be operatively connected with the electromagnet.

Preferably a relay has a first contact connecting the first actuating means with the operating means when the relay is energized, and a second contact connected to the movable support periodically energizes the relay.

A preferred embodiment of the present invention comprises a rotating support adapted to carry work pieces along a predetermined circular path, a work tool forming part of the machine tool and movably mounted at a point of the circular path, feeding means for moving the work tool towards and away from the work piece carried by the rotating support; operating means including an electromagnet for operating the feeding means, actuating means operatively connected with the electromagnet and arranged at a point along the circular path and operable by each of the work pieces for actuation of the electromagnet when the actual dimension of any one of the work pieces passing along the circular path differs from the predetermined dimension thereof, a relay having a first contact connecting the actuating means with the operating means when the relay is energized, a second contact connected to the relay, and a plurality of contact pieces symmetrically arranged with respect to the center of the rotating support and rigidly connected thereto, the contact pieces making contact with the second contact, each once per revolution of the rotating support so as to periodically energize the relay so as to periodically connect the actuating means with the operating means.

Preferably, a plurality of switches are connected in series with the contact pieces, respectively, so as to render the contact pieces operative and inoperative according as the switches are closed and opened, respectively.

A flat grinding machine according to the present invention comprises a rotary table adapted to carry articles having, respectively, faces to be flat-ground, a grinding wheel having a grinding surface arranged parallel to the rotary table and grinding the faces of the articles, means for adjusting the grinding wheel so as to change the distance of the grinding surface thereof from the rotary table, means for measuring the distance of the faces of the articles from the rotary table, means operable by each of the articles for initiating an operation of the adjusting means whenever the measuring means measure a distance of the faces of the articles from the rotary table which exceeds a predetermined value, an electric circuit operatively connected to the initiating means, and a contact forming part of the electric circuit and being operatively connected with the rotary table so as to close and open, respectively, in predetermined angular positions of the rotary table, whereby the contact by the closing thereof generates an impulse in the electric circuit actuating said means for initiating an operation of said adjusting means, the impulse being interrupted when the contact is opened by further rotation of the rotary table so that the adjusting means are rendered inoperative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
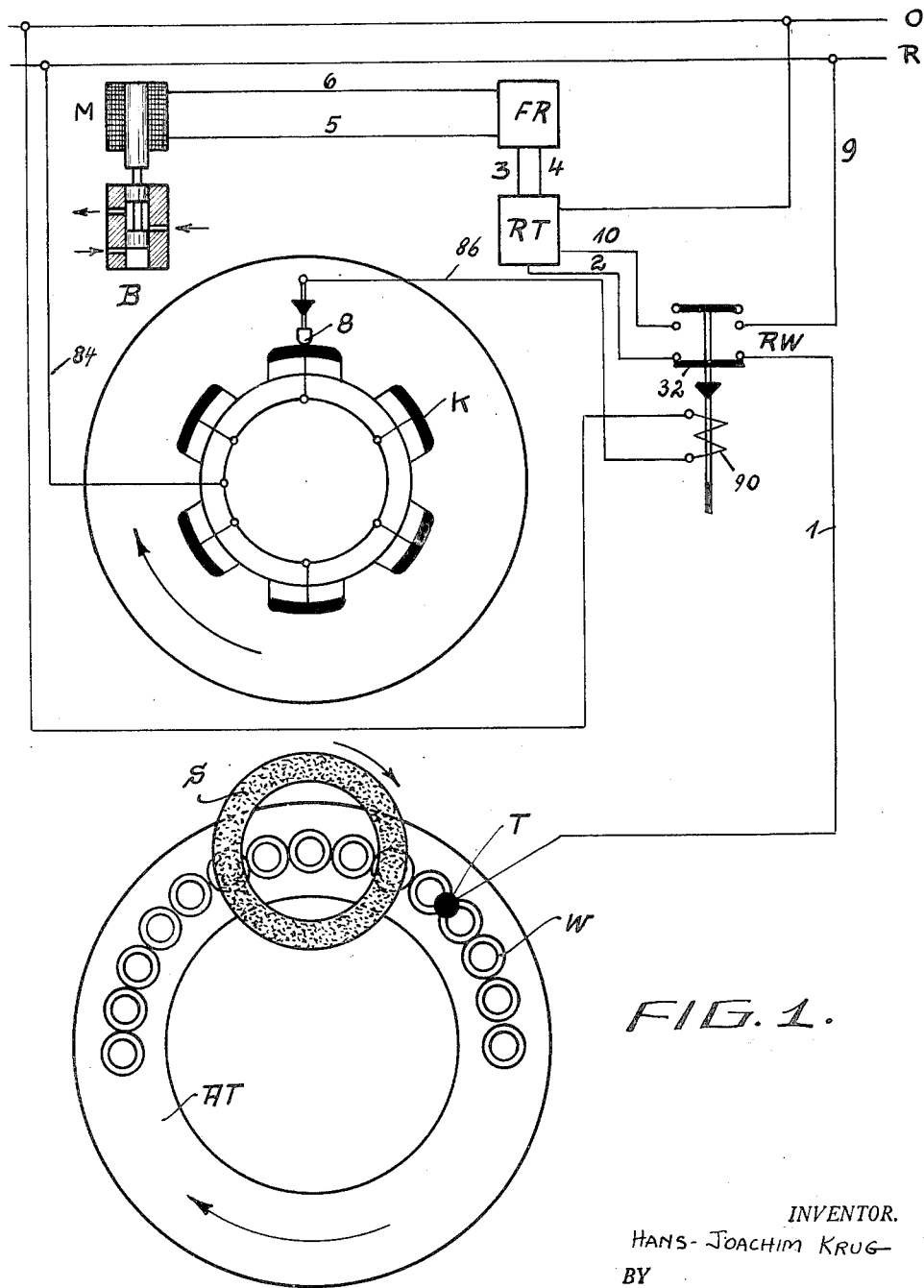
Fig. 1 is a schematic diagram illustrating an embodiment of a flat grinding machine according to the present invention, the rotary table being shown twice in plan view as seen from the upper and the lower sides thereof.

Referring now to the drawings and first to Fig. 1, AT is a rotating working table on which are placed the workpieces W. The workpieces W are moved in the direction of the arrow underneath a grinding wheel S and are thereby ground. As soon as the workpieces W are moved past beneath a measurement feeler T, this latter is lifted by an over-dimension and gives a controlling impulse through a line 1, a relay RW and a line 2 to a feeler relay RT and then through lines 3 and 4 to a feeding relay FR, which actuates a magnet M through lines 5 and 6. Feeding of the grinding wheel is effected by an adjusting means B each time that the magnet M is placed out or in circuit. If the circular table is rotated further, so that a current pick-up contact 8 comes out of contact with a contact piece K, the relay RW is switched off, that is to say, it disconnects the lines 1 and 2 and connects the lines 9 and 10, and by this means the feeler relay RT is switched off and the connections 3 and 4 to the feeding relay FR are broken. Since the feeding relay FR is only operative when a current impulse is received, no switching action takes place with interruption of the circuit. Since there is no connection from 1 to 2 by the relay RW, the measurement feeler can be lifted as often as possible by the passing of any number of workpieces W, and still no adjustment is initiated. It is only when a fresh contact piece K comes into engagement by the rotation of the working table AT that a switching operation initiated by the measurement feeler T can be passed forward to the adjusting means B. The spacing of the contacts must always be so chosen that it is somewhat greater than the distance between the measurement feeler T and the grinding wheel S.

The operation of this device is as follows:

When the rotating work table AT carrying the work pieces W rotates, the measurement feeler T cannot initiate the adjustment of the grinding wheel S by means of the adjusting means B before the circuit for the winding of the relay RW is closed by the contact 8 being in touch with one of the contact pieces K carried by the rotating table AT and thus the relay RT controlled by the measurement feeler T advances the feeding relay FR for actuating the lifting magnet M. The latter then actuates a hydraulic or mechanical adjusting device such as B.

All switch elements remain at rest until the contact 8, K on the operating table AT is again broken. The two first relays RW and RT are then rendered inoperative again. The feeding relay FR remains at rest. The spacings of the contact pieces K are so chosen that a freshly ground workpiece reaches the measurement feeler T before the next contact 8 is made on the rotating operating table AT. If this work piece already has the correct dimension, no further impulse is sent forward from the measurement feeler T, even though the first relay RW may be closed. Thus it will be apparent that no further adjustments can take place. If the work pieces become thicker again (for example by 0.005 mm.) due to wear on the grinding wheel S, a fresh adjustment is effected.

Figure 2:
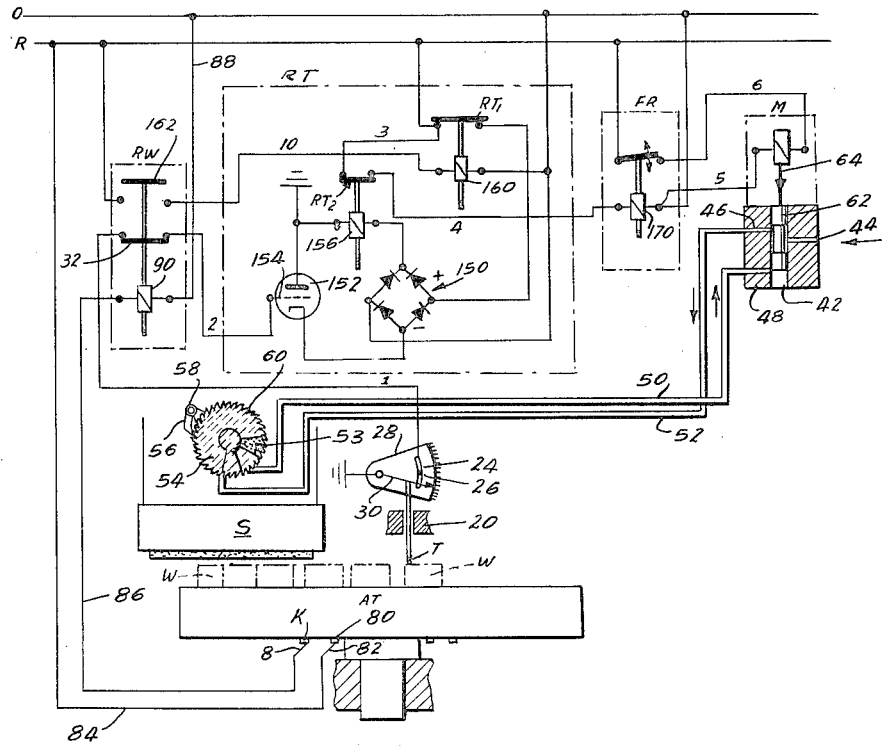
Fig. 2 is a diagram showing the same embodiment more in detail.
Figure 3:
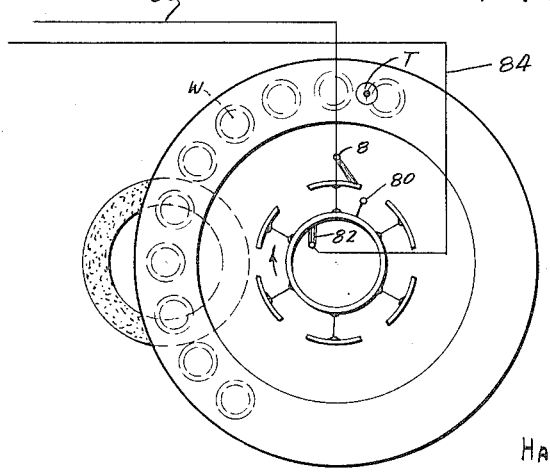
Fig. 3 is a plan view of parts of Fig. 2 seen from below.

Referring now to Figs. 2 and 3, the construction of the relays RW, RT and FR and of the grinding wheel feed is shown in greater detail. Also the connection of the adjusting means B with the grinding wheel S is shown. The measurement feeler T moves upward and downward in guiding means 20 and actuates with its upper end a movable contact 22. A stationary contact 24 is arranged for cooperation with the movable contact 22 and adjustably in a slot 26 of a sector 28 pivoted at 30. The stationary contact 24 is connected to the line 1 which is connected by connecting means such as the contact bridge 32 controlled by the relay RW to the line 2 leading to the relay RT forming part of the operating means of the feeding means B, B' of the work tool shown as a grinding wheel S.

The adjusting means comprises a cylinder having an axial boring 42 which is connected by a boring 44 to a source (not shown) of pressurized fluid such as oil. Furthermore, the axial boring 42 is connected by borings 46 and 48 to pipes 50 and 52, respectively, carrying the pressurized fluid to and from a vane piston 53 connected to a ratchet gear 54 and to the grinding wheel S (see Fig. 5), the ratchet gear 54 having a pawl 56 rotatable about a pivot 58 and being in engagement with the teeth 60 of the ratchet gear 54. A double piston 62 connected to the core 64 of the electromagnet M is slidably arranged in the axial bore 42 of the cylinder 40 and connects one of the pipes 50, 52 with the source of pressurized fluid and the other to the atmosphere so that the ratchet gear 54 is advanced. The contact pieces K arranged on the lower face of the rotating table AT are connected to an electro-conductive ring 80 with which a brush 82 is in permanent engagement. The brush 82 is connected to the bus bar R of a voltage source (not shown) by means of a conductor 84. The pick-up contact 8 is formed by a brush connected to the winding 90 of the relay RW by means of a conductor 86. The winding 90 is connected by a conductor 88 to the other bus bar O of the voltage source.

The relay RT consists actually of two relays, namely relay RT₁ which has its contacts closed when the winding of relay RT₁ is not energized and the relay RT₂, having contacts which are closed when the winding of relay RT₂ is energized. Furthermore, the relay RT contains a bridge rectifier 150 which is connected with the input thereof via the contacts of relay RT₁ to the bus bars O and R of the voltage source. The output of the rectifier arrangement 150 is connected to an amplifier tube 152 the grid 154 of which is connected to the conductor 2 connected to one of the contacts closed by the contact bridge 32. The winding 156 of the relay RT₂ is connected in the anode circuit of the tube 152. The winding 160 of relay RT₁ is connected via the conductor 10 in series with the normally open contact bridge 162 of relay RW. The contacts controlled by relay RT₂ connect conductors 3 and 4 with each other, and the winding 170 of relay FR is connected to conductor 4.

In the position shown in the drawings the contact 8 is in contact with one of the contact pieces K and in consequence thereof relay RW is energized so that bridge 32 is in closing position and bridge 162 in opening position. If now the feeler T sends an impulse, the same is transferred by the conductor 1 and the bridge 32 to the conductor 2 connected to the grid 154 of the grid 152. Thus an anode current flows through the tube 152 which energizes the winding 156 so that relay RT₂ closes its contact, this position being shown in the drawing. By the closing of the contacts of relay RT₂ a circuit is closed for the winding of relay FR so that the electromagnet M is energized.

However, when the contact 8 is not in contact with any of the contact pieces K relay RW is de-energized so that the connection between the contact actuated by the feeler T and the grid 154 of tube 152 is interrupted. Simultaneously, however, bridge 162 closes its contacts so that conductor 10 is under voltage and the winding 160 of relay RT₁ is energized thus opening its contacts so that the rectifier arrangement 150 is rendered inoperative and relay RT₂ is de-energized. Therefore the contacts of relay RT₂ are opened and the winding 170 of relay FR is de-energized so that the electromagnet M is de-energized.

Figure 4:
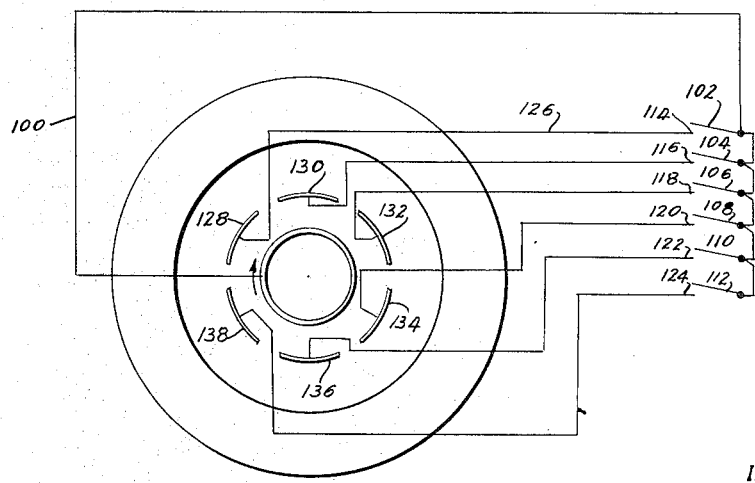
Fig. 4 is a plan view similar to Fig. 3 showing a modification.

Referring now to the modification shown in Fig. 4 the conductive ring 80 on the rotating table AT is connected to a conductor 100 which is connected with the blades 102, 104, 106, 108, 110 and 112 of manually or automatically operated switches. The switch blades 102, 104, 106, 108, 110 and 112 cooperate, respectively, with stationary contacts 114, 116, 118, 120, 122 and 124 which are connected, respectively, by conductors such as 126 to contact pieces 128, 130, 132, 134, 136, and 138 forming the contacts K. It will be seen that by means of the switches such as 102, 114, the contact pieces 128—138 can be selectively rendered operative and inoperative according as the switches are closed and opened. Therefore the adjustment frequency can be regulated as desired per rotation of the table AT.

Figure 5:
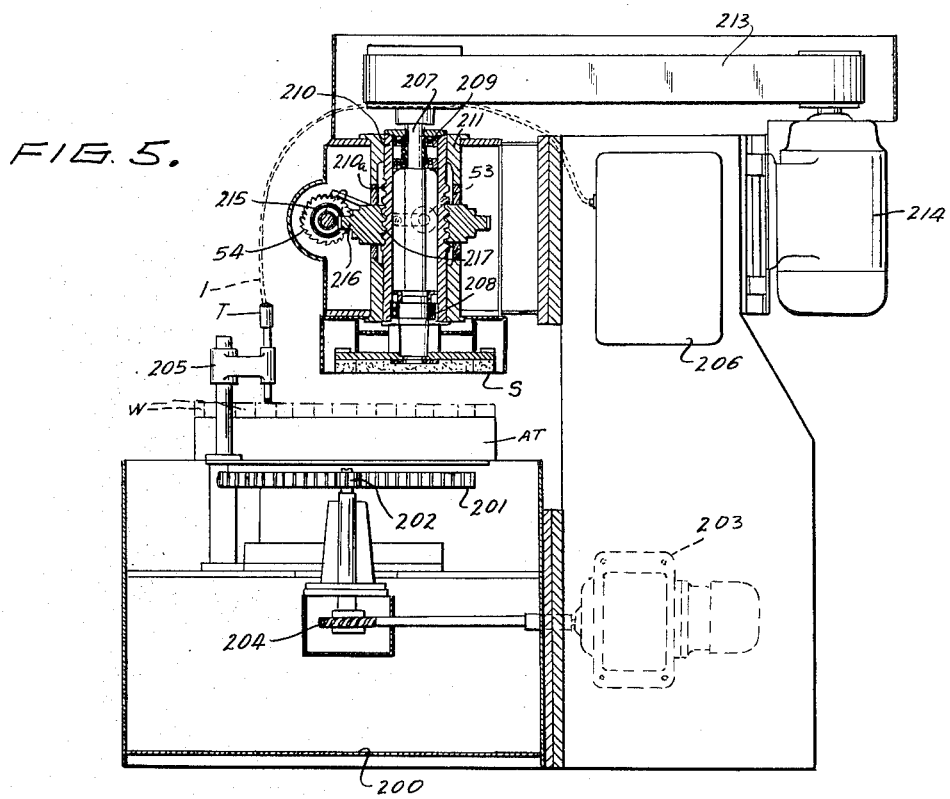
Fig. 5 is a diagrammatic elevational view, partly in section, showing the structural arrangement of a grinding machine according to the present invention.

Referring now to Fig. 5, the same is a diagrammatic elevational view, partly in section, showing the structural arrangement of a grinding machine according to the present invention. The same includes a support 200 on which the working table AT is rotatably mounted. The latter carries a toothed rim 201 which is driven by a pinion 202 which, in turn, is rotated by the motor 203 by way of a worm drive arrangement 204. In this way, the table AT carrying the work pieces W is rotated by the motor 203.

The feeler T is carried by a suitable carrier 205 which is mounted on the support 200, and is electrically connected, by means of the line 1, to the relays RW, RT and FR which are arranged within the switch box 206.

The grinding wheel S is secured to the lower end of the shaft 207, suitable bearings 208, 209 being provided for rotatably supporting this shaft within an inner sleeve 210. The latter, which is externally threaded at 210a for a purpose to be described below, is slidably arranged within an outer sleeve 211. A pulley 212 is connected to the upper end of the shaft 207, and a belt 213 is provided for establishing a driving connection between the pulley 212 and a second motor 214 so that the latter serves to rotate the grinding wheel S.

The ratchet gear 54 which is actuated by the vane piston 53, as set forth above, drives a worm 215 which cooperates with a worm wheel 216. The latter is rotatably supported by the outer sleeve 211 and is provided with an internal thread 216 which is in mesh with the external thread 210a of the inner sleeve 210. In this way, rotation of the ratchet gear 54 in opposite directions will cause the inner sleeve 210, together with the bearings 208, 209, the shaft 207 and the grinding wheel S, to be moved either towards or away from the working table AT.

It will be understood that each of the elements described above, or two or more together, may also find a useful application in other types of machine tools differing from the types described above.

While the invention has been illustrated and described as embodied in a flat grinding machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine tool comprising in combination, a movable support adapted to carry work pieces along a predetermined path; a work tool forming part of said machine tool and movably mounted at a point of said path; feeding means for moving said work tool toward and away from a work piece carried by said movable support; operating means for operating said feeding means; first actuating means operatively connected with said operating means and arranged at a point along said path and operable by each of the work pieces for actuation of said operating means when the actual dimension of any one of the work pieces passing along said path differs from a predetermined dimension thereof; connecting means for connecting said first actuating means with said operating means; and second actuating means operated by said movable support and actuating said connecting means for periodically connecting said first actuating means with said operating means.

2. A machine tool comprising in combination, a movable rotatory support adapted to carry work pieces along a predetermined circular path; a work tool forming part of said machine tool and movably mounted at a point of said circular path; feeding means for moving said work tool toward and away from a work piece carried by said movable rotatory support; operating means for operating said feeding means; first actuating means operatively connected with said operating means and arranged at a point along said circular path and operable by each of the work pieces for actuation of said operating means when the actual dimension of any one of the work pieces passing along said circular path differs from a predetermined dimension thereof; connecting means for connecting said first actuating means with said operating means; and second actuating means operated by said movable rotatory support and actuating said connecting means for periodically connecting said first actuating means with said operating means.

3. A machine tool comprising in combination, a movable support adapted to carry work pieces along a predetermined path; a work tool forming part of said machine tool and movably mounted at a point of said path; feeding means for moving said work tool toward and away from a work piece carried by said movable support; operating means including an electromagnet for operating said feeding means; first actuating means operatively connected with said electromagnet and arranged at a point along said path and operable by each of the work pieces for actuating said electromagnet when the actual dimension of any one of the work pieces passing along said path differs from a predetermined dimension thereof; connecting means for connecting said first actuating means with said operating means; and second actuating means operated by said movable support and actuating said connecting means for periodically connecting said first actuating means with said operating means.

4. A machine tool comprising in combination, a movable rotatory support adapted to carry work pieces along a predetermined circular path; a work tool forming part of said machine tool and movably mounted at a point of said circular path; feeding means for moving said work tool toward and away from a work piece carried by said movable rotatory support; operating means including an electromagnet for operating said feeding means; first actuating means operatively connected with said electromagnet and arranged at a point along said circular path and operable by each of the work pieces for actuating said electromagnet when the actual dimension of any one of the work pieces passing along said circular path differs from a predetermined dimension thereof; connecting means for connecting said first actuating means with said operating means; and second actuating means operated by said movable rotatory support and actuating said connecting means for periodically connecting said first actuating means with said operating means.

5. A machine tool comprising in combination, a movable support adapted to carry work pieces along a predetermined path; a work tool forming part of said machine tool and movably mounted at a point of said path; feeding means for moving said work tool toward and away from a work piece carried by said movable support; operating means including an electromagnet for operating said feeding means; actuating means operatively connected with said electromagnet and arranged at a point along said path and operable by each of the work pieces for actuation of said electromagnet when the actual dimension of any one of the workpieces passing along said path differs from a predetermined dimension thereof; a relay having a first contact connecting said actuating means with said operating means when said relay is energized; and a second contact connected to said movable support and periodically energizing said relay so as to periodically connect said actuating means with said operating means.

6. A machine tool comprising in combination, a movable rotary support adapted to carry work pieces along a predetermined path; a work tool forming part of said machine tool and movably mounted at a point of said path; feeding means for moving said work tool toward and away from a work piece carried by said movable support; operating means including an electromagnet for operating said feeding means; actuating means operatively connected with said electromagnet and arranged at a point along said circular path and operable by each of the work pieces for actuation of said electromagnet when the actual dimension of any one of the workpieces passing along said predetermined path differs from a predetermined dimension thereof; a relay having a first contact connecting said actuating means with said operating means when said relay is energized; and a second contact connected to said movable rotatory support and periodically energizing said relay so as to periodically connect said actuating means with said operating means.

7. A machine tool comprising, in combination, a rotating support adapted to carry work pieces along a predetermined circular path; a work tool forming part of said machine tool and movably mounted at a point of said circular path; feeding means for moving said work tool towards and away from the work piece carried by said rotating support; operating means including an electromagnet for operating said feeding means; actuating means operatively connected with said electromagnet and arranged at a point along said circular path and operable by each of the work pieces for actuation of said electromagnet when the actual dimension of any one of the work pieces passing along said circular path differs from the predetermined dimension thereof; a relay having a first contact connecting said actuating means with said operating means when said relay is energized; a second contact connected to said relay; and a plurality of contact pieces symmetrically arranged with respect to the center of said rotating support and rigidly connected thereto, said contact pieces making contact with said second contact, each once per revolution of said rotating support so as to periodically energize said relay so as to periodically connect said actuating means with said operating means.

8. A machine tool comprising, in combination, a rotating support adapted to carry work pieces along a predetermined circular path; a work tool forming part of said machine tool and movably mounted at a point of said circular path; feeding means for moving said work tool towards and away from the work piece carried by said rotating support; operating means including an electromagnet for operating said feeding means; actuating means operatively connected with said electromagnet and arranged at a point along said circular path and operable by each of the work pieces for actuation of said electromagnet when the actual dimension of any one of the work pieces passing along said circular path differs from the predetermined dimension thereof; a relay having a first contact connecting said actuating means with said operating means when said relay is energized; a second contact connected to said relay; a plurality of contact pieces symmetrically arranged with respect to the center of said rotating support and rigidly connected thereto, said contact pieces making contact with said second contact, each once per revolution of said rotating support; and a plurality of switches connected in series with said contact pieces, respectively, so as to render said contact pieces operative and inoperative according as said switches are closed and opened, respectively, thereby periodically energizing said relay so that said first contact thereof periodically connects said actuating means with said operating means.

9. A machine tool comprising in combination, a movable support adapted to carry work pieces along a predetermined path; a work tool forming part of said machine tool and movably mounted at a point of said path; feeding means for moving said work tool toward and away from a work piece carried by said movable support; operating means for operating said feeding means; first actuating means operatively connected with said operating means and arranged at a point along said path and operable by each of the work pieces for actuation of said operating means when the actual dimension of any one of the work pieces passing along said path differs from a predetermined dimension thereof; connecting means for connecting said first actuating means with said operating means; and a plurality of second actuating means operated by said movable support and actuating said connecting means for periodically connecting said first actuating means with said operating means.

10. A machine tool comprising in combination, a movably rotatory support adapted to carry work pieces along a predetermined circular path; a work tool forming part of said machine tool and movably mounted at a point of said circular path; feeding means for moving said work tool toward and away from a work piece carried by said movable rotatory support; operating means for operating said feeding means; first actuating means operatively connected with said operating means and arranged at a point along said circular path and operable by each of the work pieces for actuation of said operating means when the actual dimension of any one of the work pieces passing along said circular path differs from a predetermined dimension thereof; connecting means for connecting said first actuating means with said operating means; and a plurality of second actuating means operated by said movable rotatory support and actuating said connecting means for periodically connecting said first actuating means with said operating means.

11. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; and a contact forming part of said electric circuit and being operatively connected with said rotary table so as to close and open, respectively, in predetermined angular positions of said rotary table, whereby said contact by the closing thereof generates an impulse in said electric circuit, said impulse actuating said means for initiating an operation of said adjusting means, said impulse being interrupted when said contact is opened by further rotation of said rotary table so that said adjusting means are rendered inoperative.

12. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; and a plurality of contacts forming part of said electric circuit and being operatively connected with said rotary table so as to close and open, respectively, in predetermined angular positions of said rotary table, whereby said contacts by the closing thereof generate impulses in said electric circuit impulses actuating said means for initiating an operation of said adjusting means, said impulses being interrupted when said contacts are opened by further rotation of said rotary table so that said adjusting means are rendered inoperative.

13. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; and a plurality of contacts forming part of said electric circuit and being symmetrically arranged with respect to the center of said rotary table so as to close and open, respectively, in predetermined angular positions of said rotary table, whereby said contacts by the closing thereof generate impulses in said electric circuit impulses actuating said means for initiating an operation of said adjusting means, said impulses being interrupted when said contacts are opened by further rotation of said rotary table so that said adjusting means are rendered inoperative.

14. A flat-grinding machine comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for preparing an operation of said adjusting means whenever said measuring means measure a distance of said faces of said articles from said rotary table which exceeds a predetermined value; an electric circuit operatively connected to said preparing means; and a contact forming part of said electric circuit and being operatively connected with said rotary table so as to close and open, respectively, in predetermined angular positions of said rotary table, whereby said contact by the closing thereof generates an impulse in said electric circuit, said impulse actuating said means for preparing an operation of said adjusting means, said impulse being interrupted when said contact is opened by further rotation of said rotary table so that said adjusting means are rendered inoperative.

15. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for preparing an operation of said adjusting means whenever said measuring means measure a distance of said faces of said articles from said rotary table which exceeds a predetermined value; an electric circuit operatively connected to said preparing means; and a plurality of contacts forming part of said electric circuit and being operatively connected with said rotary table so as to close and open, respectively, in predetermined angular positions of said rotary table, whereby said contacts by the closing thereof generates impulses in said electric circuit, said impulses actuating said means for preparing an operation of said adjusting means, said impulses being interrupted when said contacts are opened by further rotation of said rotary table so that said adjusting means are rendered inoperative.

16. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; and a plurality of contacts forming part of said electric circuit and being symmetrically arranged with respect to the center of said rotary table so as to close and open, respectively, in predetermined angular positions of said rotary table, whereby said contacts by the closing thereof generate impulses in said electric circuit, said impulses actuating said means for initiating an operation of said adjusting means, said impulses being interrupted when said contacts are opened by further rotation of said rotary table so that said adjusting means are rendered inoperative.

17. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; a plurality of contacts forming part of said electric circuit and being operatively connected with said rotary table so as to close and open, respectively, in predetermined angular positions of said rotary table, whereby said contacts by the closing thereof generate impulses in said electric circuit, said impulses actuating said means for initiating an operation of said adjusting means, said impulses being interrupted when said contacts are opened by further rotation of said rotary table so that said adjusting means are rendered inoperative; and a plurality of switches connected in series, respectively, with said contacts, said switches rendering said contacts, respectively, operative and inoperative according as said switches are closed and opened.

18. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; a plurality of contacts forming part of said electric circuit and being symmetrically arranged with respect to the center of said rotary table so as to close and open, respectively, in predetermined angular positions of said rotary table, whereby said contacts by the closing thereof generate impulses in said electric circuit, said impulses actuating said means for initiating an operation of said adjusting means, said impulses being interrupted when said contacts are opened by further rotation of said rotary table so that said adjusting means are rendered inoperative; and a plurality of switches connected in series, respectively, with said contacts, said switches rendering said contacts, respectively, operative and inoperative according as said switches are closed and opened.

19. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for preparing an operation of said adjusting means whenever said measuring means measure a distance of said faces of said articles from said rotary table which exceeds a predetermined value; an electric circuit operatively connected to said preparing means; a plurality of contacts forming part of said electric circuit and being operatively connected with said rotary table so as to close and open, respectively, in predetermined angular positions of said rotary table, whereby said contacts by the closing thereof generate impulses in said electric circuit, said impulses actuating said means for preparing an operation of said adjusting means, said impulses being interrupted when said contacts are opened by further rotation of said rotary table so that said adjusting means are rendered inoperative; and a plurality of switches connected in series, respectively, with said contacts, said switches rendering said contacts, respectively, operative and inoperative according as said switches are closed and opened.

20. A flat-grinding machine, comprising in combination, a rotary table adapted to carry articles having, respectively, faces to be flat-ground; a grinding wheel having a grinding surface arranged parallel to said rotary table and grinding said faces of said articles; means for adjusting said grinding wheel so as to change the distance of the grinding surface thereof from said rotary table; means for measuring the distance of said faces of said articles from said rotary table; means operable by each of the articles for initiating an operation of said adjusting means whenever said measuring means measure a distance of said faces of said articles from said rotary table which exceeds a predetermined value; an electric circuit operatively connected to said initiating means; a plurality of contacts forming part of said electric circuit and being symmetrically arranged with respect to the center of said rotary table so as to close and open, respectively, in predetermined angular positions of said rotary table, whereby said contacts by the closing thereof generate impulses in said electric circuit, said impulses actuating said means for initiating an operation of said adjusting means, said impulses being interrupted when said contacts are opened by further rotation of said rotary table so that said adjusting means are rendered inoperative; and a plurality of switches connected in series, respectively, with said contacts, said switches rendering said contacts, respectively, operative and inoperative according as said switches are closed and opened.

References Cited in the file of this patent

UNITED STATES PATENTS

| | | |
|---|---|---|
| 1,198,772 | Roach | Sept. 19, 1916 |
| 1,436,674 | Olsson | Nov. 28, 1922 |
| 2,049,611 | Harrison et al. | Aug. 4, 1936 |
| 2,148,744 | Hall | Feb. 28, 1939 |